United States Patent Office 3,148,262
Patented Sept. 8, 1964

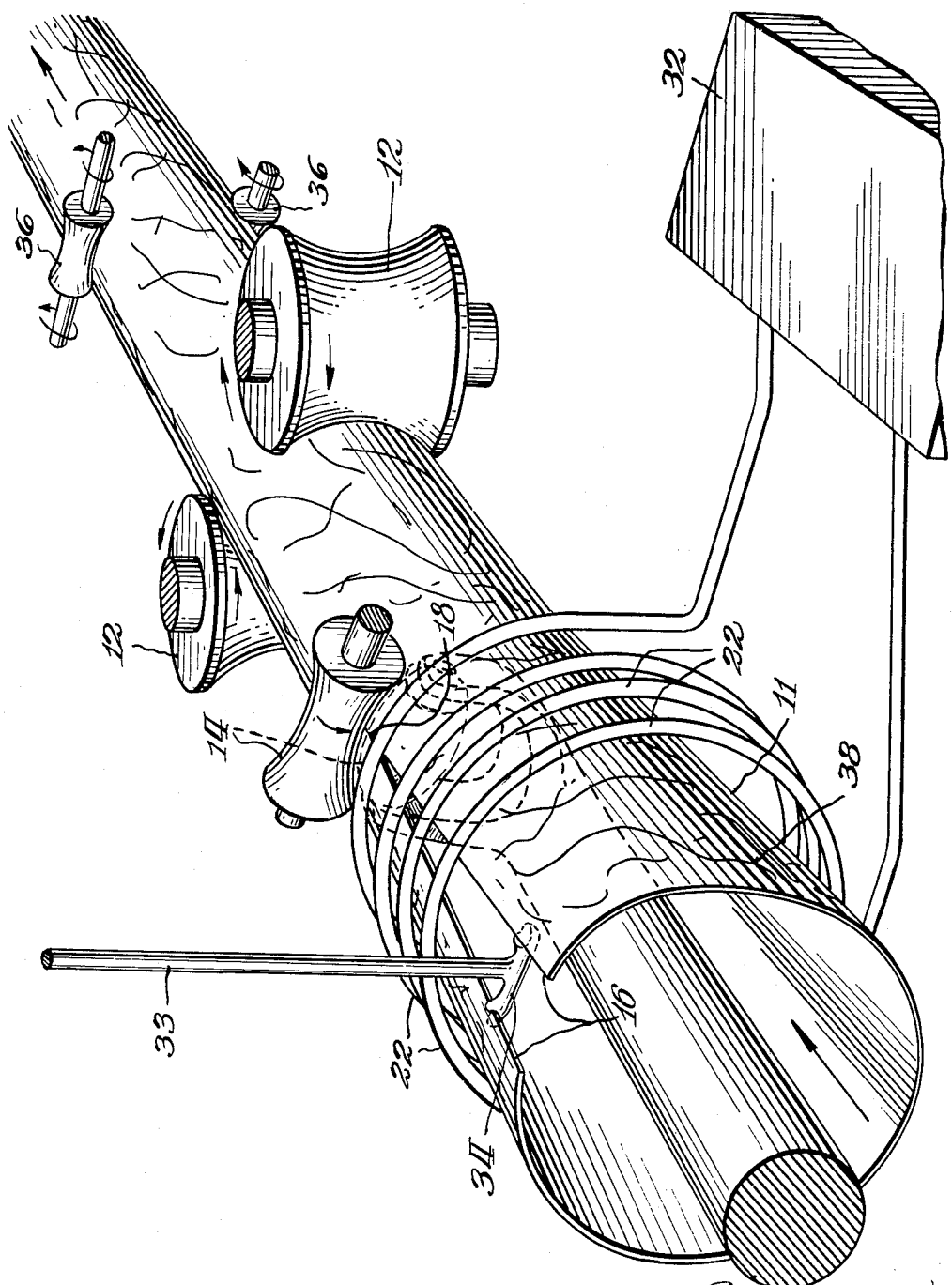

3,148,262
INDUCTION WELDING OF TUBES
Harold K. Hughes, Chicago, Ill., assignor to Continental Can Company, Inc., New York, N.Y., a corporation of New York
Filed July 6, 1961, Ser. No. 122,188
4 Claims. (Cl. 219—8.5)

This invention relates to metallic can manufacturing processes and apparatus. More particularly, and in one important aspect, this invention relates to apparatus for heating the opposite edge portions of a thin metal strip being formed to a tube.

This heating in one illustrative embodiment of the invention, is accomplished by passing induced electrical current along the strip edges prior to their closure and through a conductive contact bar extending within the metallic strip. Thereafter, these heated metal edge portions are forged together to form a substantially continuous, metal cylinder. This cylinder is subsequently separated transversely into individual can bodies.

Heretofore, progressive welding together of opposite edge portions of a thin, substantially continuous, longitudinally extending, metal strip, thereby to form a metallic cylinder or tube, has been known. After the formation of such a cylinder, segments have been separated from this cylinder to form can bodies.

An important problem in the manufacture of such can bodies has been that of accomplishing efficient, uniform and rapid heating of strip edge portions. This is necessary in order that high volume production of welded can bodies may be attained without derogation of the quality and integrity of the welds acomplished.

Contacting electrodes have been employed for applying alternating electric energy to such strip edge portions. Thus, these strip edges have been brought to suitable temperature for forging together in a well-known manner.

Such contacting electrode methods for introducing electrical heating energy to strip edge portions have been effective indeed. But these methods have been, in particular applications, subject to some objections. One of these objections has lain in the fact that mechanical contacts may be subject to chatter or unreliable contact. These mechanical contacts may further effect physical deformations upon the surface of a tube being formed. That is, such contacts may abrade the tube surface. Obviously such abrasion reduces the commercial acceptability of a resulting can.

A related problem has been encountered heretofore by the structures of F. R. Carpenter Patent Number 2,697,769, granted December 21, 1954.

For welding together edges of an aluminum strip for protecting an enclosed cable, Carpenter teaches the passage of the cable with a folded-around aluminum strip through an induction coil. Thus, in accordance with the teachings of Carpenter, alternating current is induced to flow across the junction of the aluminum strip edge portions and around the strip along a substantially circumferential path.

Thus, following the Carpenter teachings, the circumferential heating current flow becomes concentrated at the junction point of the strip edge portions.

This structure is no doubt effective. The current flowing circumferentially about the Carpenter strip, however, is substantially dissipated in achieving no objective useful to the purposes of the can industry. That is, energy is expended in the circumferential current flow through strip portions removed from the edges to be heated. Thus, in the tremendous production of tubing required for the manufacture of cans, this detailed, minor energy loss, resulting from the circulation of current circumferentially about the metal tube of Carpenter, becomes a tremendously expensive loss of energy required to manufacture billions of cans.

Further, concentration of heating current at only a single point, the junction point of the strip edges, may give rise to extreme temperature variations under high speed operating conditions as the current of an industrial generator may vary. Thus, erratic welding may be accomplished by the effective strip edge heating concentration at a single point.

While such erratic welding may be readily acceptable in the manufacture of a metal shield for cable, nothing less than perfectly reliable welding suffices for the container industry.

Thus, it is a principal object of the present invention to concentrate the circulation of heating current only in those portions of the strip which are to be welded together. That is, it is an object of the invention economically to circulate heating current through those strip edge portions proximate to a desired weld point but to avoid circulation of these currents in other portions of the strip. Thus, it is an object of the invention to reduce the amount of welding power required to form can bodies.

It is a further object of the invention to eliminate strip surface abrasion which may be attendant upon the application of heating current through physical, conductive contacts.

It is a further specific object of the invention to improve the reliability of high speed tube welding processes.

These and other objects are accomplished in accordance with the invention in one embodiment by a structure in which a thin metal strip is transported longitudinally, at the same time the opposite strip edge portions are brought together into overlapping relation. In accordance with this invention, these edge portions are heated by currents induced in the strip edge portions as these edge portions are brought together toward contacting or overlapped relation rather than by currents passed to the strip through electrodes which contact the strip.

In lieu of these electrodes, a coil of suitable dimensions is connected to an alternating current generator. This coil is disposed about the path of the strip which is to be welded to a closed configuration in the process of manufacturing can bodies. This coil is disposed longitudinally along the path of travel of this strip at a point just prior to the overlapping of the strip edge portions.

At a position prior to the entry of the strip into the influence of this coil, a conductive shorting bar is disposed interiorly of the closing strip to maintain conductive contact between the separated strip edge portions. Thus, this bar spaces apart the strip edges and provides current controlling contacts for routing electrical heating energy about these edges. By its interior disposition, however, the bar avoids exterior deformation of the strip surfaces. Otherwise external contact by this bar might abrade the strip surface and thus derogate the commercial appeal of the completed cans.

Thus, high frequency currents, induced by currents from the generator which is connected in circuit with the coil, circulate along strip edge portions from the junction point of these portions through the above noted shorting bar. Hence, no wasteful circumferential current flows about the entire strip body.

The invention will be more clear and other objects, features, and advantages thereof will become apparent from a consideration of the drawing, of the following brief description of an illustrative embodiment of the invention shown therein, and of the appended claims.

Referring now more particularly to the drawing, in the single figure there is shown a metallic strip 11 arranged for transport through tube forming apparatus under the urging of tensioning apparatus 36. This apparatus may be for example, any convenient powered roller mechanism such as is well known in the art. Such a general arrangement is disclosed in the patent to W. C. Rudd Number 2,774,857, granted December 18, 1956. Strip edge portions 16 are transversely converged at a junction point 18 for subsequent passage through hour-glass rolls 12 and forging rolls 14. In the former rolls the strip is constrained to a desired closed configuration. In the latter rolls the edge portions are forged together by pressure to give a unitary interface for these erstwhile strip edges. As shown, the exterior surface of the strip 11 is decorated as by imprinting a typical decoration pattern 38 such as is well known in the can industry.

To effect this forging together, prior to the joinder of the strip edge portions at the point 18, the strip is passed through a circumferentially disposed coil 22. This coil is connected as shown to receive an alternating current from the generator 32. This generator advantageously may be of the type known as Westinghouse Model No. 70–B–450. This coil 22 is disposed circumferentially about the tube 11 in spaced apart relation from the tube. The coil is, nonetheless, closely proximate to the tube at a point prior to the joinder of the opposite strip edges at point 18. Current from the generator 32 passes through the coil, thus to induce an alternating electromotive force in the strip edges 16.

With particular advantage this current generator and, consequently, the resulting induced electromotive force are in the frequency range extending upwardly from 50 to 500 kilocycles. Thus, the current induced in the strip 11 tends to concentrate in the strip edges in accordance with the well known physical laws described by Maxwell's Equations.

Without additional structure, this so induced current would pass from one strip to another and circulate about the entire circumference of the strip 11. Accordingly heat would be wastefully dissipated at positions well removed from the strip edge portions which are desired to be joined. This wastage is avoided with the shorting bar 34. This bar is disposed in the path of travel of the strip 11 at a point prior to the passage of the strip through the aforementioned induction coil.

That is, the bar is positioned longitudinally opposite the joinder point 18 with respect to the coil 22.

The bar is advantageously arranged, as shown, to make electrical contact with the interior portions of the opposite strip edge portions to be heated and subsequently forged together. Thus, exterior surface deformation of the tube is avoided and the decoration pattern 38 is preserved.

The alternating current generator, as noted, delivers currents to the coil, preferably in the frequency range extending upwards from 50 to 500 kilocycles. Thus, currents induced in the metal strip 11 tend to flow along the strip edge portions, through the shorting bar 34 and the joinder point 18 of the opposite strip edges. Accordingly, substantially all of the electrical energy induced in the strip 11 is directed toward raising the temperature of the strip edge portions toward adequate welding temperature.

Passing through the coil, the now contacting opposite strip edge portions 16 are constrained together by the hour-glass rolls 12. Under this constraint the strip edges are forged together by the forge rolls 14. Thus, following principles of this invention, the finish of this exterior surface of the tubularly formed strip 11 is preserved from the unsightly effects of abrasion by large, current carrying electrodes. Further, the forging together of the strip edge portions 16 is rendered substantially independent of normal aberrations of the thickness of the strip 11. This follows from the fact that current for heating these edge portions flows during a substantial travel of the strip. Hence, momentary current interruptions which might result from physical electrode contact with an uneven strip surface are eliminated.

Still further, heating energy for the strip, supplied in electrical form by the generator 32, is concentrated along the strip edge portions to be welded. Despite this concentration in the strip edge portions, this heating is maintained along a significant length of these strip edge portions. Thus, these edges are cumulatively heated in the passage of the strip.

This cumulative heating leads immediately, to a substantially uniform heating of all portions of the strip edge as these portions reach the joinder point 18. Hence, following the principles of the invention, welds accomplished by the forging rolls 14 are smooth and continuous. This smoothness and continuousness follows immediately upon the elimination of sometimes erratic physical contact between the electrical energy source and the strip itself.

From this single illustrative embodiment of the principles of the invention, numerous and varied departures may be made without departing from the spirit and scope of the invention as set forth in the claims.

What is claimed is:

1. Apparatus for welding together opposite edge portions of a continuous metal strip comprising means for transporting said metal strip along a predetermined path, means for transversely constraining said strip toward a closed configuration between first and second spaced points along said path whereby edge portions of the strip are brought to overlapping relation at a joinder point, a conductive coil wound about the strip between said points, said coil having an axis parallel to said path, means connected in circuit with said coil for inducing current in said strip, and a conductor bar supported transversely of said path between said points contacting each of the opposite edge portions whereby heating current induced in said strip circulates about said opposite strip edge portions through said joinder point and the conductive bar to heat said edge portions to a forging temperature.

2. The apparatus as defined in claim 1 wherein said conductive bar includes opposite end portions each of which includes means for positively contacting said edge portions.

3. The apparatus as defined in claim 1 wherein said conductive bar includes opposite end portions, and each of said end portions includes means for positively contacting at least two surface portions of said strip edge portions.

4. The apparatus as defined in claim 1 wherein said conductive bar includes opposite end portions, and each of said end portions includes faces arranged substantially normal to each other for positively contacting two surface portions of each of said strip edge portions.

References Cited in the file of this patent

UNITED STATES PATENTS

| | | |
|---|---|---|
| 2,687,464 | Crawford | Aug. 24, 1954 |
| 2,692,322 | Bennett | Oct. 19, 1954 |
| 2,774,857 | Rudd et al. | Dec. 18, 1956 |
| 2,886,691 | Rudd | May 12, 1959 |
| 3,072,772 | Jabbusch | Jan. 8, 1963 |